United States Patent [19]

Matzner

[11] Patent Number: 5,553,109
[45] Date of Patent: Sep. 3, 1996

[54] APPARATUS AND METHODS FOR SIMULATING A CHANGE IN AXIAL POWER SHAPE DURING A NUCLEAR FUEL ROD BUNDLE TRANSIENT

[75] Inventor: Bruce Matzner, San Jose, Calif.

[73] Assignee: General Electric Company, Schenectady, N.Y.

[21] Appl. No.: 328,435

[22] Filed: Oct. 25, 1994

[51] Int. Cl.$^6$ ........................................... G21C 17/00
[52] U.S. Cl. ........................... 376/463; 434/218; 392/500; 219/439
[58] Field of Search ..................... 376/463, 277, 376/259, 245; 434/218; 392/447, 448, 451, 454, 500, 501; 219/430, 437, 439, 441, 442, 483, 486, 487

[56] References Cited

U.S. PATENT DOCUMENTS

| | | | |
|---|---|---|---|
| 4,326,122 | 4/1982 | McCulloch et al. | 376/463 |
| 5,098,641 | 3/1992 | Shiraiski et al. | 376/245 |
| 5,200,144 | 4/1993 | Berta | 376/463 |
| 5,361,729 | 11/1994 | Trihey | 122/17 |

*Primary Examiner*—Daniel D. Wasil
*Attorney, Agent, or Firm*—Nixon & Vanderhye

[57] ABSTRACT

Apparatus is provided for simulating a nuclear fuel rod bundle transient condition and includes a vessel for containing a coolant, a pair of heating elements disposed in the vessel and a power supply for supplying power over time to each of the heating elements. The power supply is independently controlled whereby a variable supply of power over time to each heating element is provided, thus simulating the variation in power output and axial flux shape in a nuclear fuel bundle as a function of time.

8 Claims, 2 Drawing Sheets

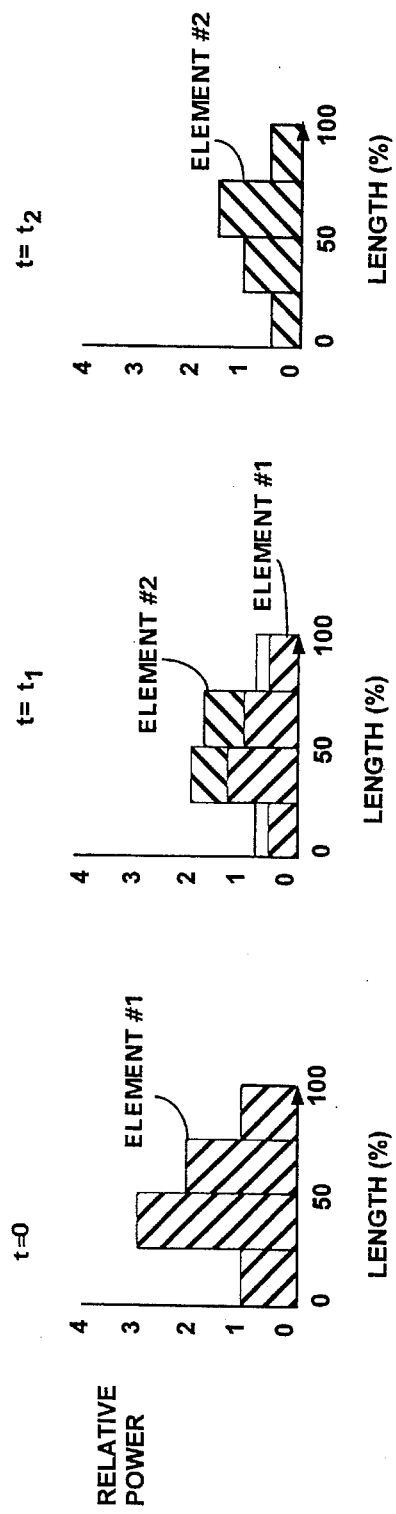
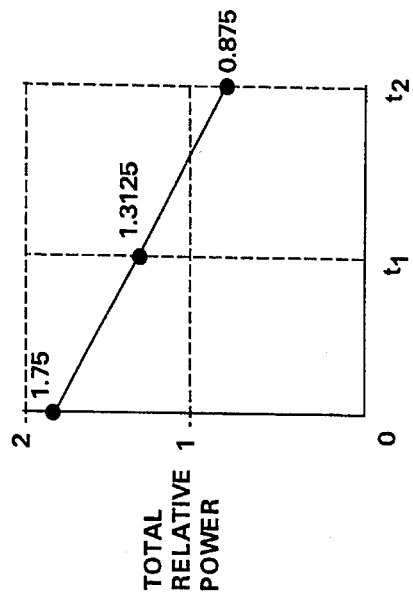

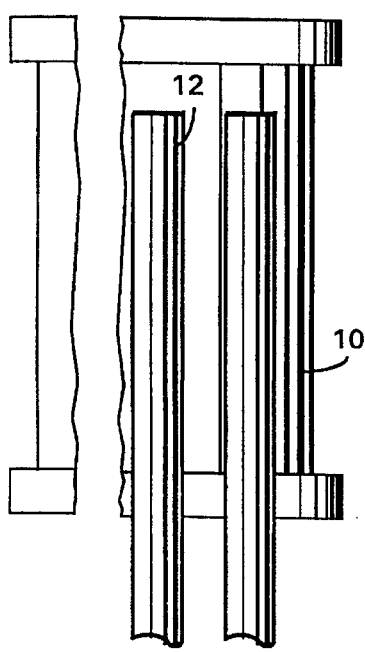
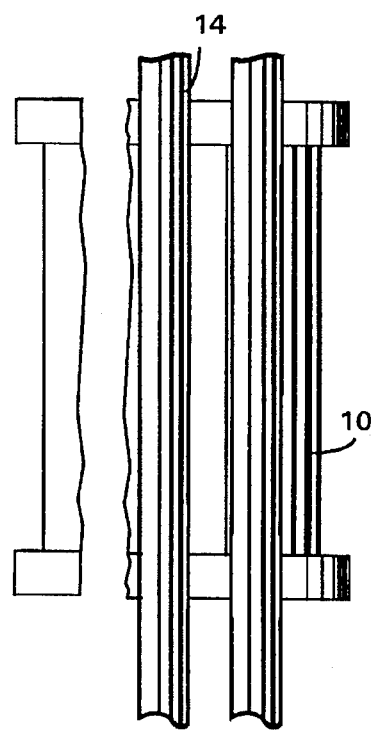
FIG. 2(a)  FIG. 2(b)
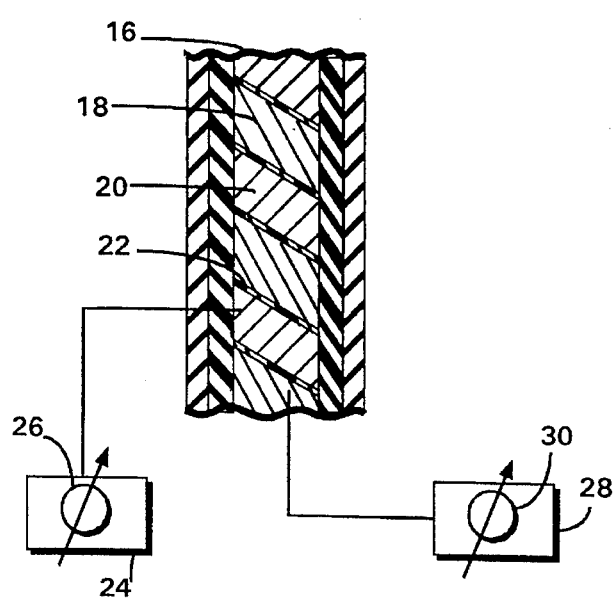
FIG. 3
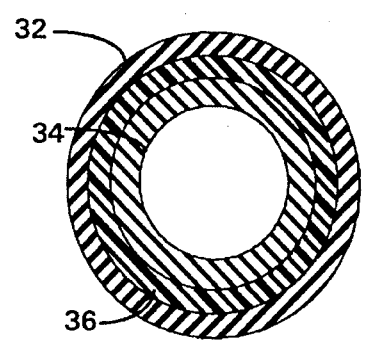
FIG. 4

APPARATUS AND METHODS FOR SIMULATING A CHANGE IN AXIAL POWER SHAPE DURING A NUCLEAR FUEL ROD BUNDLE TRANSIENT

TECHNICAL FIELD

The present invention relates to apparatus and methods for simulating a nuclear fuel rod bundle transient and particularly relates to such apparatus and methods for simulating the effect of the change in both integrated bundle power and the axial power or flux shape as a function of time during a transient, for example, in a boiling water reactor.

BACKGROUND

There are many different types of nuclear reactor transient events. For example, the load on a turbine driven by steam from a nuclear power plant may be removed from the turbine by any one of a number of events, causing a short in the electric power transmission lines. Should such transient event occur, typically the stop valves to the turbine are closed, shutting down the delivery of steam to the turbine. The nuclear reactor, however, is still producing full power. To control the reactor in view of the transient, the control rods are driven into the reactor and valves are opened to bypass steam to a condenser. Safety considerations, however, require preparation for failures in the system, including, for example, those where the condenser bypass valve cannot be closed and the reactor continues to produce full steam power.

In that event, and in a boiling water reactor (BWR), a pressure spike occurs, the position of the boiling boundary between the single and two-phase regions within the reactor vessel shifts upwardly, the average void distribution of the fuel changes downwardly and the overall power output increases. This changes the axial power or flux shape of the fuel rod bundle. The axial power or flux shape is the power associated with each axial location in the fuel bundle. In a typical situation, and early in the life of the fuel, the power distribution is at a peak adjacent the bottom of the fuel bundle and the instantaneous power along the fuel bundle upwardly from the peak falls off. When a transient occurs, the boiling boundary moves upwardly along the fuel bundle and displaces the peak of the heat flux curve upwardly along the bundle. The value of the peak of the heat flux curve also changes in response to movement of the boiling boundary. Thus, as the transient progresses, the peak of the heat flux curve is not only displaced upwardly along the fuel bundle but also changes in value so that a greater outlet peak power distribution momentarily occurs. As the effect of control rod insertion and increased reactor voiding decrease neutron flux levels, the peak reactor surface heat flux will be in approximately two seconds.

Present-day nuclear fuel bundle simulators employ fuel rod simulators in a closed vessel containing a coolant. Such fuel bundle simulators, however, are limited in their capability. For example, present testing matches total bundle fuel rod surface heat flux with anticipated nuclear fuel bundle surface heat flux and it is the result of these tests which are used to quantify transient computer codes for application to reactor transient analyses. More particularly, today all test facilities employ heating elements in which the only control over each heating element is the magnitude of the power input to the heating elements. While more or less power could be supplied to the heating elements, the simulated axial power or flux shape is fixed. Thus, while the power supply to the heating elements could be varied over time to obtain the correct total bundle power as a function of time, the change in the axial power or flux shape could not be simulated.

DISCLOSURE OF THE INVENTION

According to the present invention, it has been recognized that during a transient event in a nuclear reactor core not only does the fuel bundle total power change but also the axial power shape varies with time. To my knowledge, this effect has not been studied in an out of reactor test using fuel rod simulators. Obtaining this type of experimental data is highly desirable in order to be able to check the ability of computer codes which predict the transient performance of nuclear reactor fuel to evaluate this more realistic simulation of postulated reactor transient events.

The power of the fuel bundle can be represented mathematically as a function of axial position and time, i.e.:

$$P=f(x,t); \qquad \text{Equation (1)}$$

where x and t represent axial position upwardly along the heated length and time from the beginning of the transient event, respectively. Mathematically, a function $f(x,t)$ can be approximated as used in Equation (1) by $$f(x,t) \approx f_1(x,t) + f_2(x,t); \qquad \text{Equation (2).}$$

To accomplish the foregoing, first, each fuel rod simulator (FRS) will have similar performance characteristics, i.e., power versus axial position and time, as the other FRS's in the bundle. Each FRS will have two separate, independent heating elements with identical power versus length characteristics. Each of the two heating element groups will be connected to two separate independent power supplies and each group will also have its own axial power shape. In this way by varying each group of heating elements separately with time, the functions $f_1(x,t)$ and $f_2(x,t)$ can be generated during a simulated nuclear reactor transient event, thus providing time varying axial power shapes typical of reactor transient events.

Various designs of the heating elements can be provided. For example, a double helix heating member may be provided comprised of an internal double helix formed of the two heating elements separated from an outer tubular metallic cladding by suitable electrically insulating material. The heating element can be fabricated from a uniform wall thickness tube using a numerically controlled machine tool. In this way, two continuous helices are generated with a width versus length variation using the same table which represents the desired power versus length relationship for each of the length terms in Equation (2). One end of each of the two helices is connected to a common ground and the other ends to the two independently varied power supplies.

In another form of the invention, the two heating elements may comprise two coaxial heating members separated by electrical insulating material. The outer element may also serve as the cladding for the fuel rod simulator. These elements can be either solid like the direct heater presently in use, or of the helix (either single or double helix) type. If the elements are solid, the axial power profile can be realized by either using tapered wall tubes of one material or uniform wall thickness tubes of s more than one material, with different coefficients of electrical resistivity.

The method of FRS removal from the test vessels is also important to their design. In single-ended heaters, the heating element simulative of the fuel rod exits the pressure vessel at only one end while the opposite end remains in the vessel. In double-ended heaters, the heating elements exit the pressure vessel at both the top and bottom ends and, accordingly, pass straight through the vessel. Either heater style (single or double-ended) may be of the helix or coaxial type, or a combination of both types.

In a preferred embodiment according to the present invention, there is provided apparatus for simulating a nuclear fuel rod bundle transient comprising a vessel for containing a coolant, a pair of heating elements disposed in the vessel for disposition in the coolant, a power supply for supplying power over time to each of the heating elements and means for independently controlling and thereby varying the supply of power over time to each heating element whereby an approximation of the variation in power and axial flux shape in a nuclear fuel bundle as a function of time can be obtained.

In a further preferred embodiment according to the present invention, there is provided apparatus for simulating a nuclear fuel rod bundle transient comprising a vessel for containing a coolant, a plurality of nuclear fuel rod simulating members disposed in the vessel for disposition in the coolant and forming a simulated nuclear fuel rod bundle, each member including a pair of heating elements, a power supply for supplying power over time to each of the heating elements and means for independently controlling and thereby varying the supply of power over time to each heating element of the plurality of nuclear fuel rod simulating members whereby an approximation of the variation in power and axial flux shape in a nuclear fuel bundle as a function of time can be obtained.

In a still further preferred embodiment according to the present invention, there is provided a method for simulating a nuclear fuel rod bundle transient comprising the steps of disposing a pair of heating elements simulative of a nuclear fuel rod in a vessel containing a coolant, independently supplying power to the heating elements and controlling the supply of power to the heating elements independently to vary the power supplied over time to simulate the variation over time of the power output and axial flux shape in a nuclear fuel bundle.

Accordingly, it is a primary object of the present invention to provide novel and improved apparatus and methods for simulating an out-of-pile nuclear reactor transient event to approximate the variation over time of the power and axial flux shape in a nuclear fuel bundle during a transient event.

BRIEF DESCRIPTION OF THE DRAWINGS

FIGS. 1(a)), 1(b) and 1(c) are graphical representations of the output of a two-element fuel rod simulator according to the present invention and particularly plot relative power as a function of axial position for three different times, respectively;

FIG. 1(d) plots total relative power for both elements of the fuel rod simulator as a function of time;

FIGS. 2(a)) and 2(b) are two different forms (single and double-ended) of heating elements for the simulator of the present invention;

FIG. 3 is a fragmentary cross-sectional view of the double helix heating element simulative of a fuel rod in accordance with the present invention; and FIG. 4 is a cross-sectional view of another embodiment of the heating elements using the coaxial type configuration.

BEST MODE FOR CARRYING OUT THE INVENTION

Referring to FIGS. 2(a)) and 2(b), there is illustrated a closed pressure vessel 10 having a coolant, for example, water, within the vessel 10. Heating elements according to the present invention are disposed within vessel 10 in contact with the coolant. Such heating elements may comprise a single-ended heater rod 12, as in FIG. 2(a)), or a double-ended heater rod 14, as illustrated in FIG. 2(b). A single-ended heater rod exits the pressure vessel 10 only at one end, while the double-ended heater rod exits the pressure end at both the top and bottom ends of vessel 10. One or more of the heater rods embodying the two heater elements as described below may be disposed in the vessel 10.

Referring now to FIG. 3, there is illustrated an example of a single-ended heater rod comprised of a double helix heating element. Heater rod 16 includes internal double helix heating elements 18 and 20 separated from an outer tubular metallic cladding 22 by suitable electrical insulation, typically boron nitride. The heating element can be fabricated from a uniform wall thickness tube using a numerically controlled machine tool. Thus, two continuous helices are generated with a width versus length variation which represents the desired power versus length relationship for each of the two length terms $f_1(x)$ and $f_2(x)$, as set forth in Equation (2). One end of each of the two helices is connected to ground and the other ends are coupled to two independently variable power supplies. Thus, the heater rod 16 may be connected to the independent power supply 24 having a controller 26 for varying the power output from supply 24 as a function of time. Similarly, power for the heater rod 16 is supplied independently from a separate power supply 28 having a separate controller 30 for varying the power output from supply 28 to the heater rod 16 as a different function of time than the controller 26.

Referring now to FIG. 4, there is illustrated in cross-section a pair of coaxially and radially spaced heating elements forming a heater rod. The coaxial heater elements 32 and 34 are separated one from the other by electrically insulating material 36. It will be appreciated that more than two coaxially arranged heating elements can be provided to more accurately represent Equation (1) for a nuclear fuel rod. Also, the cladding may serve as the outer element 34 for the fuel rod simulator. These elements can be either solid or of a helical configuration. If the elements are solid, the axial power profile can be realized by either using tapered wall tubes of one material or uniform wall thickness tubes of more than one material with different coefficients of electrical resistivity. The ends of the two heating elements have a common ground and the other two ends are connected to electrically separate power supplies, similarly as in the embodiment of FIG. 3.

With respect to double-ended heater rods as illustrated in FIG. 2, those rods exit the pressure vessel at both the top and bottom ends. Double-ended heater rods may be of the helix or coaxial type, or a combination of both types.

With reference to FIG. 1(a)), there is graphically depicted the output of the two heater element FRS versus length, i.e., the length along the simulated fuel rod from its lower end to its upper end, at three different times. As will be appreciated, the power supplied to each heater rod element can be independently and continuously changed over time. Thus, by continuously changing the power supplied to the heating elements, with one element being weighted toward an initial steady state condition and the other weighted toward a transient condition, the total power developed is additive of the two heater elements at each location along the simulated nuclear rod and the change in the flux shape as a function of time of a nuclear transient condition can be simulated. Thus, while previously only the total bundle power output as a function of time was available, with the present invention, both the total bundle power output and the axial change in the flux shape of the simulated nuclear fuel bundle versus time can be approximated.

A simplified example is given in FIGS. 1(a)) and 1(b). In FIG. 1(a)), the power output of two heater elements at time t=o is given s wherein heater element (1) is at 100% power and heater element (2) is at 0% power, giving an average relative power of about 1.75 for the four given axial locations (nodes). At time t=$t_1$, the heater elements are both at 50% power thereby giving an average relative power of about 1.312 for the four given axial nodes. At time t=$t_2$, the heater element (1) is at 0% power and heater element (2) is at 100% power, giving an average relative power of about 0.875 for the four axial nodes. In FIG. 1(b), the graph gives the total relative power variation for both heater elements with axial position and time. These values for the simplified representative example of FIGS. 1(a)) and 1(b)) may thus be tabulated as follows:

| | Tabular Values for FIG. 1 Relative Powers | | | | | | |
|---|---|---|---|---|---|---|---|
| Axial | t = o (Element #) | | t = $t_1$ (Element #) | | | t = $t_2$ (Element #) | |
| Node | (1) | (2) | (1) | (2) | (1 + 2) | (1) | (2) |
| 1 | 1 | 0 | 0.5 | 0.25 | 0.75 | 0 | 0.5 |
| 2 | 3 | 0 | 1.5 | 0.5 | 2.0 | 0 | 1.0 |
| 3 | 2 | 0 | 1.0 | 0.75 | 1.75 | 0 | 1.5 |
| 4 | 1 | 0 | 0.5 | 0.25 | 0.75 | 0 | 0.5 |
| Average Relative Power | 1.75 | 0 | 0.875 | 0.4375 | 1.3125 | 0 | 0.875 |

Consequently, it will be seen that the independently controlled heater elements may approximate or simulate in power output and axial flux shape a nuclear fuel bundle as a function of time.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. Apparatus for simulating a nuclear fuel rod bundle transient comprising:

a vessel for containing a coolant;

a plurality of nuclear fuel rod simulating members disposed in said vessel for disposition in the coolant and forming a simulated nuclear fuel rod bundle;

each member including a pair of heating elements;

a power supply for supplying power over time to each of said heating elements; and means for independently controlling and thereby varying the supply of power over time to each said heating element of each member of said plurality of nuclear fuel rod simulating members thereby to simulate a change over time in both power output and axial flux shape of a nuclear fuel rod bundle.

2. Apparatus according to claim 1 wherein said pair of heating elements terminate at one end within said vessel and at other ends outside said vessel.

3. Apparatus according to claim 1 wherein said pair of heating elements have ends terminating outside said vessel.

4. Apparatus according to claim 1 wherein said heating elements comprise a double helix arrangement thereof, a surrounding tubular cladding and electrical insulating material between said heating elements and said cladding.

5. Apparatus according to claim 1 wherein said heating elements are coaxial relative to one another and an electrically insulating material between said coaxially arranged heating element.

6. Apparatus according to claim 5 wherein said pair of heating elements have ends terminating outside said vessel.

7. A method for simulating a nuclear fuel rod bundle transient in a vessel having a plurality of nuclear fuel rod simulating members, each member having two heating elements, comprising the steps of:

independently supplying power to said heating elements of each said member; and controlling said supply of power to said heating elements independently of one another to vary the power supply over time to each element to simulate a change over time in both the (i) power output and (ii) axial flux shape of a nuclear fuel bundle.

8. A method for simulating a nuclear fuel rod bundle transient comprising the steps of:

providing at least one nuclear fuel rod simulating member within a vessel containing a coolant;

providing said member with a pair of heating elements extending substantially the full length of said member;

independently supplying power to said heating elements of said member; and controlling said supply of power to said heating elements independently of one another to vary the power supplied over time to each element to simulate a change over time in both the (i) power output and (ii) axial heat flux shape of a nuclear fuel bundle.

* * * * *